Figure 1:
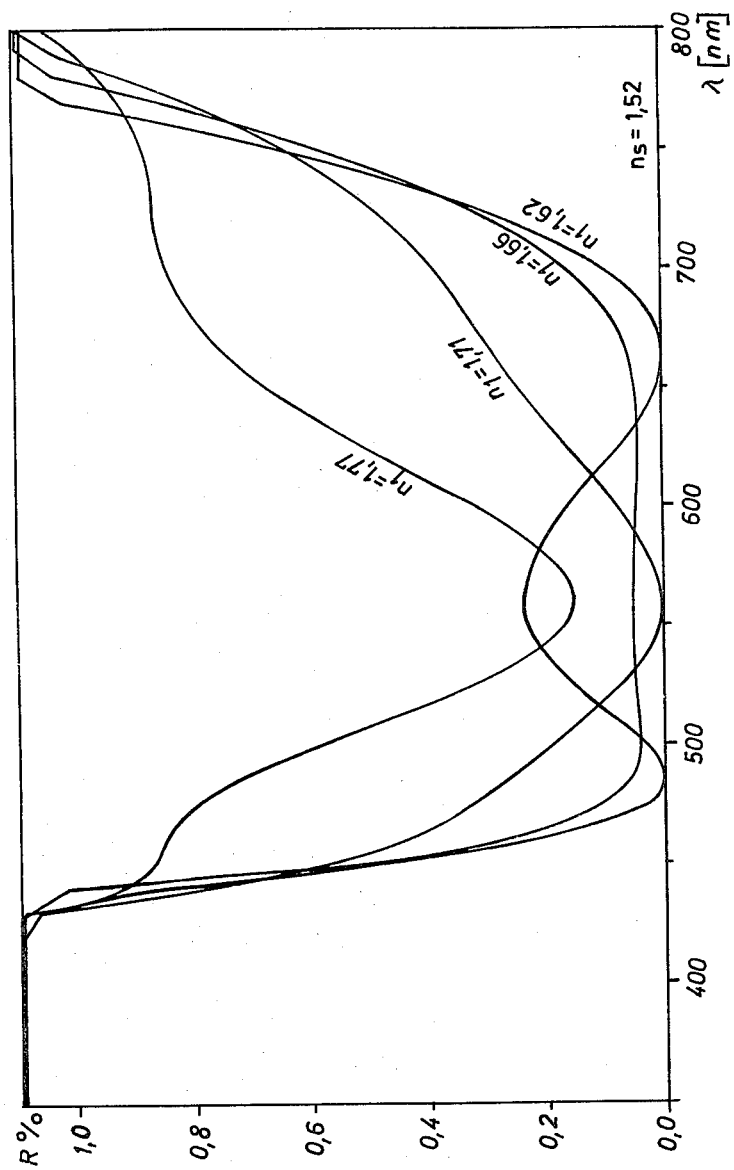

United States Patent [19]

Ganner et al.

[11] 4,372,987
[45] Feb. 8, 1983

[54] METHOD OF PRODUCING A MULTILAYER ANTI-REFLECTION COATING

[75] Inventors: Peter Ganner, Innsbruck; Theodor Wallner, Volders, both of Austria

[73] Assignee: D. Swarovski & Co., Wattens, Austria

[21] Appl. No.: 241,732

[22] Filed: Mar. 9, 1981

[30] Foreign Application Priority Data

Mar. 12, 1980 [DE] Fed. Rep. of Germany ....... 3009533

[51] Int. Cl.³ .......................... G02B 1/10; B05D 1/36
[52] U.S. Cl. ..................................... 427/42; 427/162; 427/164; 427/166
[58] Field of Search ................... 427/42, 162, 164, 166

[56] References Cited

U.S. PATENT DOCUMENTS 3,185,020 5/1965 Thelen ............................. 350/164
3,604,784 9/1971 Louderback et al. ............. 350/164

*Primary Examiner*—James R. Hoffman
*Attorney, Agent, or Firm*—Bacon & Thomas

[57] ABSTRACT

A method of producing a multilayer anti-reflection coating with an interference effect for optical purposes, and optical bodies with a multilayer anti-reflection coating is described, of which at least one layer has a low refractive index, at least one other layer has a medium refractive index, and—if necessary—other layers have a high refractive index, and whereby the layer of medium refractive value is produced by depositing a mixture of tantalic oxide and aluminum oxide by means of an electron gun in a vacuum in a reactive atmosphere.

6 Claims, 5 Drawing Figures

METHOD OF PRODUCING A MULTILAYER ANTI-REFLECTION COATING

The invention concerns a method of producing a multilayer anti-reflection coating with an interference effect for optical purposes as well as optical bodies with a multilayer anti-reflection coating.

Optical glass of which the refractive index ranges from 1.45 to 1.8 is generally coated with anti-reflective material to reduce reflective loss.

The simple or double layers that were previously used to improve optical bodies such as lenses, prisms, filters, etc. are being replaced more and more by qualitatively superior multilayers due to the introduction of process-controlled coating plants in mass-production.

Since on the one hand the substrates that are to be improved—generally inorganic and organic glass—have a large refractive index range (n=1.45–1.8), but on the other hand a multilayer anti-reflection system functions optimally only in a narrow refractive index range, the entire range has usually been divided up to now in two partial ranges, a low refractive range, usually $n \leq 1.62$, and a higher refractive range, usually $n \geq 1.62$, and for each range a different anti-reflection layer system was applied.

However, the division of the entire range in only two partial ranges is too crude. The anti-reflective effect is only optimal for a narrow partial range in each range, so that compromises must be made for substrates of which the refractive indices have ranges incompatible with optimal dereflection.

Furthermore, the use of two different layer systems is unfavorable from the production point of view, as the vaporization plants must be altered and differing production steps are necessary. Therefore there is a great risk of error and reduction in quality.

Thus there is a considerable need to provide optical bodies with a multilayer anti-reflection coating, so that the coating can be exactly adapted in a simple way to the refractive index of the substrate that is to be coated, in order to optimize the anti-reflective effect without having to make the compromises that are presently accepted.

Anti-reflective multilayer coatings are not new. In the U.S. Pat. No. 3,185,020, for example, a triple-layer coating of the type $\lambda/4$-$\lambda/2$-$\lambda/4$ is described. A $\lambda/4$-layer is one for which the product of layer thickness x refractive index, the so-called optical layer thickness, equals one quarter of the reference wavelength. This applies analogously to the $\lambda/2$-layer.

The problem with such familiar multilayer coatings as these is that the layer nearest to the substrate—depending on the refractive index of the substrate—must have a refractive value ranging from 1.65 to 1.8.

However, up to now no substances have been found with good mechanical qualities that have this refractive index range.

Thus many suggestions have been made to solve this problem in another way.

For example, the well-known fact was made use of, that a $\lambda/4$-layer, no matter what its refractive index is, can be replaced by a symmetrical triple-layer system. Then multilayer systems are attained for which the refractive index of the compound $\lambda/4$-layer can be adjusted by the layer thickness of the single layers.

The disadvantages connected with this suggestion, however, are that several layers in any case provide more potential sources of error in their production, condensation problems can arise with the partial layers, which can be very thin, and the charging period is increased by the greater number of layers.

It has also been suggested that mixtures of high and low refractive substances be applied.

For example, in the DE-AS No. 21 54 030 a multilayer coating is described for which mixtures of cerium fluoride and ceric oxide or mixtures of cerium fluoride and zinc sulphide are used. There are also descriptions in the literature of mixtures of ceric oxide and silicon dioxide, zinc sulphide and magnesium fluoride, zinc sulphide and sodium aluminum hexafluoride as well as ceric oxide and magnesium fluoride.

All of these familiar systems, however, have at least one component which is known to be inadequate in respect to mechanical qualities and stability. The systems described are therefore not suited to the production of multilayer anti-reflection coatings which fulfill the necessary requirements of optical quality, mechanical qualities and stability.

General references to the use of layers out of oxide mixtures can also be found in the DE-OS Nos. 20 50 556, 24 57 474, 29 27 856, the U.S. Pat. No. 3,604,784 and the GB-PS No. 13 80 793. However, these publications refer to the production of highly refractive $\lambda/2$-middle-layers of homogeneous construction and thus with an invariant refractive index. These publications do not reveal a suggestion for $\lambda/4$-layers with a medium refractive index which are the layers closest to the substrate and can be optimized in their reflection reduction relative to the substrate.

The invention is based on the problem of creating a method of producing a multilayer anti-reflection coating which has a layer of medium refractive value for which the refractive index is adjustable, so that it can be optimally adapted to the substrate, and which meets the highest demands of mechanical qualities and stability.

A layer of medium refractive value is here assumed to be especially one with a refractive index ranging from $n=1.65$ and $n=1.80$. Layers with a low refractive index have refractive indices beneath this range, and those with a high refractive index are above.

The invention is based on the finding that this problem can be solved by forming the layer of medium refractive value by depositing a mixture of tantalic oxide and aluminum oxide.

The subject-matter of the invention is a method of producing a multilayer anti-reflection coating with an interference effect for optical purposes, whereby at least one layer has a low refractive index, at least one other layer has a medium refractive index and—if necessary—other layers have a high refractive index, and this method is characterized in that the layer of medium refractive value is produced in a vacuum by means of an electron gun by depositing a mixture of tantalic oxide and aluminum oxide.

The subject-matter of the invention is also an optical body with a multilayer anti-reflection coating with an interference effect, of which at least one layer has a low refractive index and at least one other layer has a medium refractive index, and this optical body is characterized in that the layer of medium refractive value consists of a homogeneous mixture of tantalic oxide and aluminum oxide. Preferably, at least one of the layers of medium refractive value is the layer closest to the substrate.

A mixture of aluminum oxide and tantalic oxide has surprisingly proved to provide a layer of medium refractive value with the necessary qualities.

Aluminum oxide in the form of $Al_2O_3$ has a refractive index of $n=1.62$, while tantalic oxide in the form of tantalic pentoxide has a refractive index of $n=2.1$. A mixture of the oxides allows the desired range of $n=1.65$ to $n=1.8$ to be fully met. Mixtures with refractive indices beyond this range are also possible. The more tantalic oxide is in the mixture, the higher the refractive index of the layer is, so that an appropriate mixture can be produced according to the particular substrate.

Mixtures of aluminum oxide and tantalic oxide have proved to have excellent adhesion to glass. The layer has outstanding mechanical and chemical qualities. The coating is abrasion-proof and scratch-resistant, and is also extremely resistant against moisture, change of climate, salt-water and organic solvents.

The layer consisting of the two oxides proves to be homongeneously constructed and thus has a refractive index which extends throughout the layer thickness. This could not be predicted with certainty.

It is of course extremely important that by the method according to the invention, neither the order of the layers, nor the optical layer thickness of one or more layers must be altered. A mixture of aluminum oxide and tantalic oxide that is optimized relative to the substrate is all that must be applied.

Due to the possibility of optimizing the layer of aluminum oxide and tantalic oxide, layer systems which guarantee maximal reduction of reflection can be produced.

The method according to the invention allows for optical bodies of every kind to be provided with the desired multilayer anti-reflection coatings, especially such optical bodies as lenses, prisms and filters, for example interference filters. The glass of the optical bodies can have varying refractive indices, generally between approximately 1.45 and 1.8

The method according to the invention allows for the production of very different multilayer coatings. A preferred coating is a triple-layer coating constructed as follows: the first layer has medium refractive value and a thickness of $\lambda/4$, the second layer has high refractive value and a thickness of $\lambda/2$ and the third layer has low refractive value and a thickness of $\lambda/4$.

The construction of multilayer coatings with thicknesses other than $\lambda/4$ and $\lambda/2$, however, also comes into question. Such layer systems as these are described for example in the DE-OS 23 34 875.

For particular applications it is also possible to form one of the layers—preferably one of the layers of high refractive value—as a transparent, electrically conductive and thus heatable layer. For example, a $\lambda/2$-layer of indium oxide/tin oxide can be vaporized or spattered on for this purpose.

It is simple to determine the optimal refractive indices that arise relative to the substrate refractive index through a certain mixture of aluminum oxide and tantalic oxide. This should be made clear by the example of the familiar $\lambda/4$-$\lambda/2$-$\lambda/4$-triple-layer coating and the diagram.

The reflection curves were calculated for the entire refractive index range of optical substrates, whereby only the refractive index of the layer next to the substrate served as a variable with medium refractive value. The refractive indices for the middle layer with a high refractive index of $n=2.1$ and for the outmost layer with a low refractive index of $n=1.38$, were presumed constant.

Figure 2:
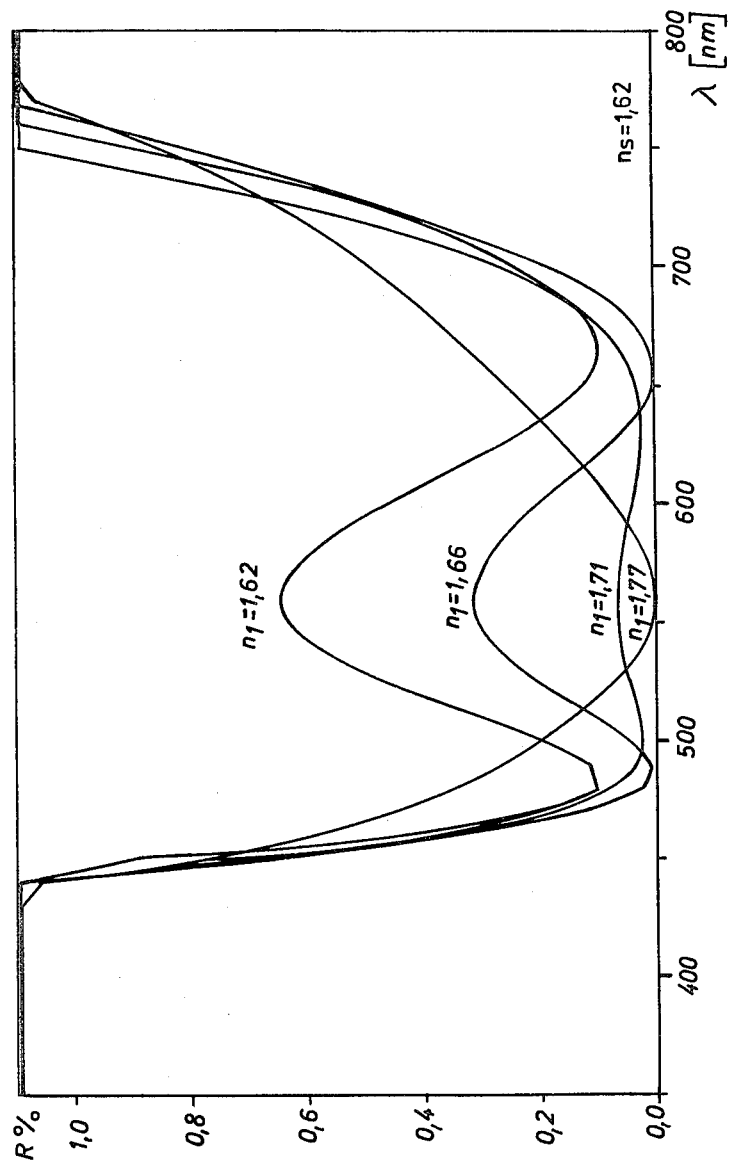
Figure 3:
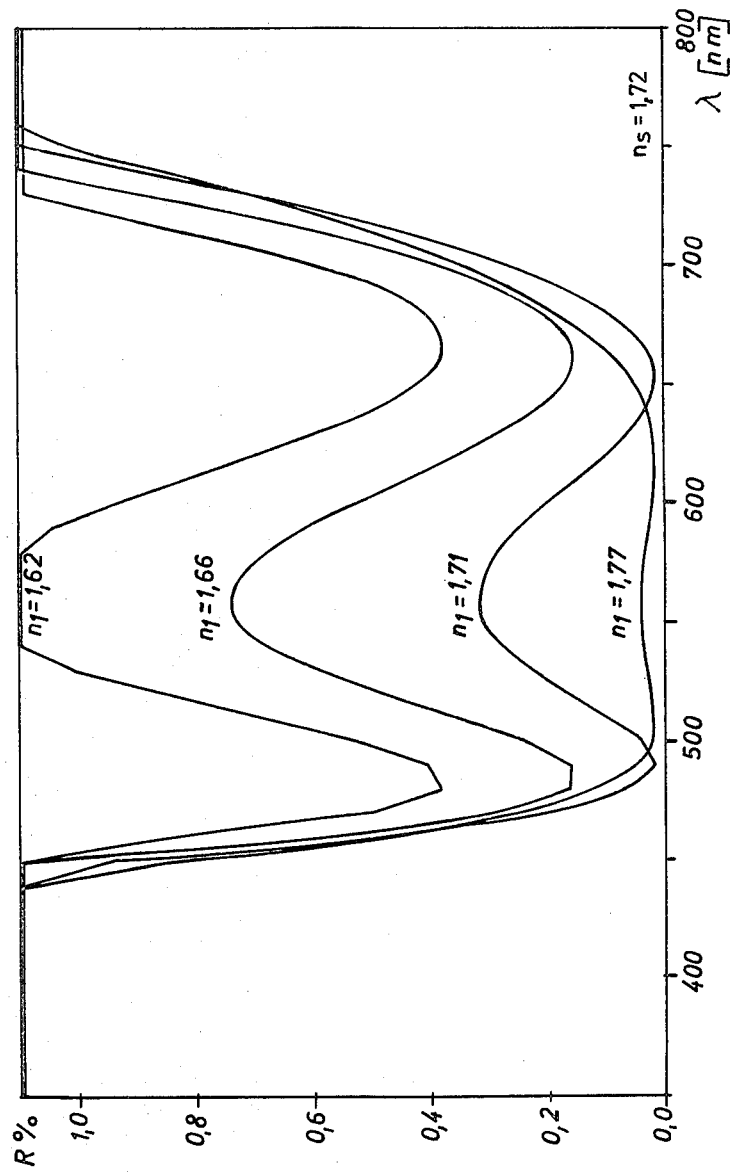
Figure 4:
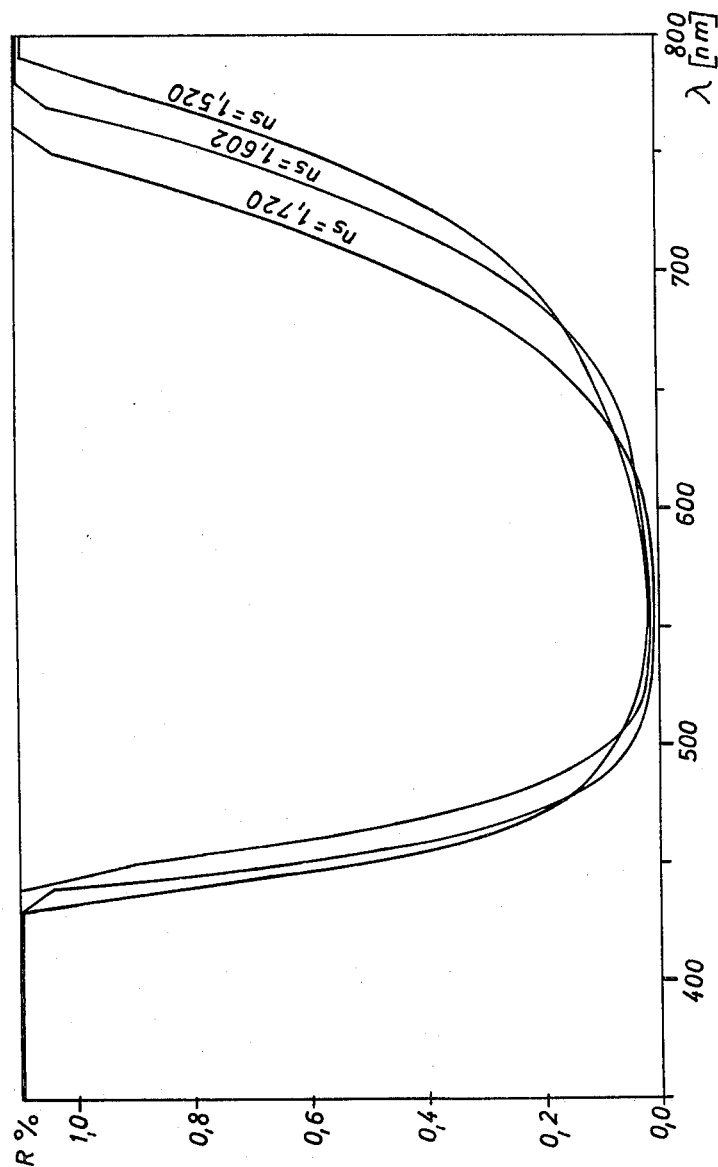
Figure 5:
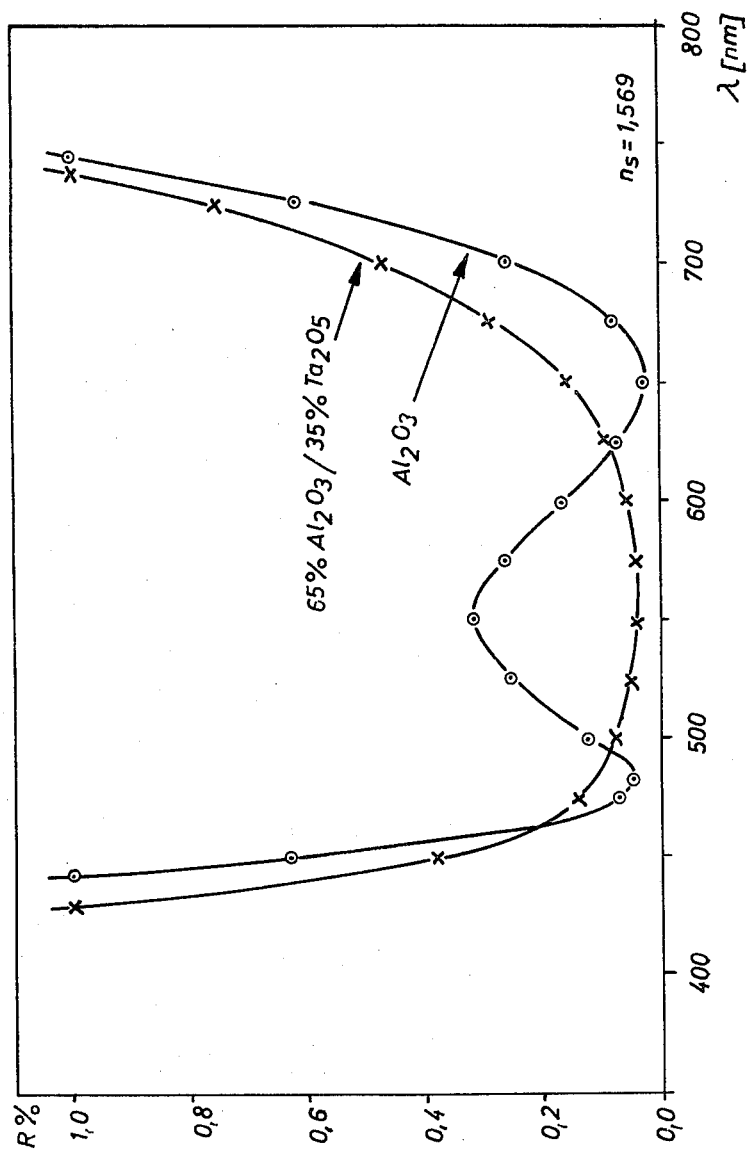

The diagram shows the reflection curves that arise according to the various refractive indices of the substrate. These are:

FIG. 1 the reflection curves corresponding to the refractive indices $n_1=1.62$, $n_1=1.66$, $n_1=1.71$ and $n_1=1.77$, when the refractive index of the substrate is $n_s=1.52$;

FIG. 2 the reflection curves corresponding to a substrate refractive index of $n_s=1.62$;

FIG. 3 the reflection curves corresponding to a substrate refractive index of $n_s=1.72$;

FIG. 4 the reflection curves arising for three typical optical glass types when the refractive index $n_1$ is optimized, and FIG. 5 the measured reflection curves of pure $Al_2O_3$ and a mixture of 35 wt. % tantalic oxide and 65 wt. % aluminum oxide, when the substrate refractive index is $n_s=1.569$.

FIG. 1 shows that when the refractive index of the substrate is 1.52, the layer next to the substrate should have a refractive index ranging from 1.66 to 1.71, while for substrates with a refractive index of 1.62 (see FIG. 2) refractive indices between 1.71 and 1.77 are optimal, and for a substrate refractive index of 1.72 (see FIG. 3) a refractive index of 1.77 or more yields the best results.

FIG. 4 shows that the optimization of the layers that is achieved by the method according to the invention allows for the production of multilayer coatings that lead to minimal reflectance of the optical body.

The three curves refer to substrate refractive indices $n_s$ of 1.520, 1.603 and 1.728.

Of course, the sensitivity of the eye must also be taken into consideration for optimization, if desired. Therefore a minimal reflection at about 550 nm is usually aimed for.

The best layer quality is achieved by the method according to the invention by means of vaporization with an electron gun. This means of vaporization can be applied for the entire mixture range of both components, aluminum oxide and tantalic oxide.

The vaporization takes place in a reactive atmosphere under oxygen superpressure.

The vaporization chiefly deals with a mixture of $Al_2O_3$ and $Ta_2O_5$. However, it is also possible to use other aluminum oxides and tantalic oxides or the metals. Alternatively, the two mixture components can also be vaporized simultaneously but separately. This well-known coating method is described for example in the U.S. Pat. No. 3,604,784.

The preferred mixing ranges of aluminum oxide and tantalic oxide are between 5 and 95, especially 25 to 95 wt. % tantalic oxide and the rest aluminum oxide.

The following order of layers is, for example, especially advantageous for the triple-layer system already described. The $\lambda/4$-layer next to the substrate consists of a mixture of aluminum oxide and tantalic oxide that is adjusted to the substrate refractive index. The middle $\lambda/2$-layer of high refractive value consists of tantalic oxide applied in the same manner by means of an electron gun in a reactive atmosphere. The outmost $\lambda/4$-layer of low refractive value consists of magnesium fluoride. For this layer construction the mixture is approximately 30–40 wt. % tantalic oxide and 60–70 wt.

% aluminum oxide—depending on the substrate refractive index, of course.

If the large band width attainable in a triple-layer coating is not important, for example for the improvement of laser optics, for which narrow-band reflection curves suffice, a double-layer system can be used instead of a triple-layer system, by leaving out the middle λ/2-layer. The same criteria are valid for the adaptation to the substrate refractive index. The refractive index of the mixture is adjusted as exactly as possible, in order to reduce the residual reflectance of the reference wavelength to zero.

There are also multilayer anti-reflection layers that contain substantially more than three layers and at least one layer of medium refractive value between approximately 1.65 and 2.0, as well (cf. for example the AT-PS No. 34 01 67). The method according to the invention can also be used advantageously for such layers as these.

FIG. 5 shows the measured reflection curves of a triple-layer coating. The middle λ/2-layer of high refractive value consisted of tantalic oxide, the outmost λ/4-layer of low refractive value consisted of magnesium fluoride. The refractive index of the substrate was $n_s = 1.569$. The two curves indicate that a considerable reduction of reflectance can be attained by using a mixture of 35 wt. % tantalic oxide and 65 wt. % aluminum oxide instead of just aluminum oxide for the λ/4-layer next to the substrate. In particular, the reflexion maximum disappears, which otherwise occurs at the point of highest sensitivity of the eye.

We claim:

1. A method of producing a multilayer anti-reflection coating with an interference effect for optical purposes upon a substrate, of which at least one layer of the coating has a low refractive index, below $n = 1.65$, and at least one other layer of the coating has a medium refractive index, from $n = 1.65$ to $n = 1.80$, comprising producing the layer of medium refractive value in a vacuum in a reactive atmosphere by depositing upon said substrate a mixture of tantalic oxide and aluminum oxide which has been vaporized by means of an electron gun.

2. A method according to claim 1 characterized in that at least one of the layers of medium refractive value is the layer next to the substrate.

3. A method according to claim 1 or 2 characterized in that a first layer of medium refractive value out of a mixture of tantalic oxide and aluminum oxide in a thickness of λ/4, a second layer of high refractive value, above $n = 1.80$, in a thickness of λ/2 and a third layer of low refractive value in a thickness of λ/4 are deposited consecutively on the substrate.

4. A method according to claim 1 or 2 characterized in that a first layer of medium refractive value out of a mixture of tantalic oxide and aluminum oxide in a thickness of λ/4 and a second layer of low refractive value in a thickness of λ/4 are deposited consecutively on a substrate.

5. A method according to claim 1 or 2 characterized in that the layer of medium refractive value is formed by depositing a mixture of 25 to 95 wt. % tantalic oxide and 5 to 75 wt. % aluminum oxide.

6. A method according to claim 3 characterized in that the first layer is a mixture of approximately 30–40 wt. % tantalic oxide and approximately 60–70 wt. % aluminum oxide, the second layer is tantalic oxide and the third layer is magnesium fluoride.

* * * * *